US012454218B1

(12) United States Patent
Mestauskas (10) Patent No.: US 12,454,218 B1
(45) Date of Patent: Oct. 28, 2025

(54) DRIVER ATTENTION ALERT DEVICE (71) Applicant: Ron Mestauskas, Eureka, KS (US)

(72) Inventor: Ron Mestauskas, Eureka, KS (US)

(*) Notice: Subject to any disclaimer, the term of this patent is extended or adjusted under 35 U.S.C. 154(b) by 18 days.

(21) Appl. No.: 18/640,172

(22) Filed: Apr. 19, 2024

(51) Int. Cl.
*G08B 21/06* (2006.01)
*B60Q 9/00* (2006.01)
*B60R 11/00* (2006.01)

(52) U.S. Cl.
CPC .............. *B60Q 9/00* (2013.01); *B60R 11/00* (2013.01); *B60R 2011/0017* (2013.01); *B60R 2011/0059* (2013.01)

(58) Field of Classification Search
USPC .... 340/439, 407.1, 575, 576, 461, 572–573, 340/571, 667, 440, 989, 435, 555
See application file for complete search history.

(56) References Cited

U.S. PATENT DOCUMENTS

| | | | |
|---|---|---|---|
| 5,151,944 A | 9/1992 | Yamamura | |
| 5,684,461 A * | 11/1997 | Jones | G08B 21/06 340/439 |
| 6,057,768 A * | 5/2000 | Barnoach | G08B 21/06 340/407.1 |
| 6,107,922 A * | 8/2000 | Bryuzgin | G08B 21/06 340/576 |
| 6,147,612 A * | 11/2000 | Ruan | G08B 21/06 340/576 |
| 7,703,847 B2 | 4/2010 | Szablewski | |
| 8,098,165 B2 * | 1/2012 | Demirdjian | A61B 5/7475 340/425.5 |
| 9,295,608 B2 | 3/2016 | Ma | |
| 10,576,861 B1 * | 3/2020 | Medge | B60N 2/882 |
| D898,446 S | 10/2020 | Long | |
| 2001/0048362 A1 * | 12/2001 | Spencer | B62D 15/029 340/425.5 |
| 2008/0061612 A1 * | 3/2008 | Crampton | B60N 2/0237 297/256.13 |
| 2009/0121882 A1 * | 5/2009 | Al-Mutairi | G08B 21/06 340/575 |
| 2015/0375651 A1 | 12/2015 | Palma | |
| 2016/0052391 A1 * | 2/2016 | Walsh | G08B 21/06 340/575 |
| 2017/0071525 A1 * | 3/2017 | Lin | G08B 21/06 |
| 2021/0083519 A1 * | 3/2021 | Yamamoto | B60R 16/02 |
| 2023/0233003 A1 | 7/2023 | Karout | |

FOREIGN PATENT DOCUMENTS

WO WO2017010824 1/2017

\* cited by examiner

*Primary Examiner* — Daniel Previl (57) ABSTRACT

A driver attention alert device includes a panel that has a plurality of straps coupled to and extending rearwardly from the panel. The straps are extendable around a headrest of a driver's seat of a vehicle to retain the panel on the headrest thereby positioning the panel behind a driver's head when the driver is seated in the driver's seat. A proximity unit is integrated into the panel and the proximity unit senses a distance between the panel and the driver's head when the driver is seated in the driver's seat. Furthermore, the proximity unit emits a perceptible alert when the proximity unit senses the distance between the panel and the driver's head exceeds a trigger distance to alert the driver that the driver's head has tilted forwardly as a result of falling asleep.

8 Claims, 8 Drawing Sheets

DRIVER ATTENTION ALERT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to driver alert devices and more particularly pertains to a new driver alert device for alerting a driver of a vehicle when the driver's head has tilted downwardly as a result of falling asleep or being distracted by a personal electronic device. The device includes a panel and a plurality of straps attached to the panel which can be extended around a headrest of a vehicle seat to mount the panel to the headrest. The device includes a proximity sensor integrated into the panel to sense the distance between the panel and the driver's head. The device includes a pair of speakers and a pair of lights and a vibration unit integrated into the panel which are each turned on when the proximity sensor senses the distance between the panel and the driver's head. In this way the driver is alerted to either pull over and rest or the cease being distracted by their personal electronic device.

(2) Description of Related Art Including Information Disclosed Under 37 CFR 1.97 and 1.98

The prior art relates to driver alert devices including a variety of driver alert devices that each includes a mechanical means of determining a position of a driver's head with respect to a headrest of a vehicle and a driver drowsiness system that includes a plurality of sensors which are integrated into a variety of locations in a vehicle for detecting the position of a driver of the vehicle and a driver alert device that includes a brainwave sensor integrated into a headrest of a vehicle for detecting brain waves associated with sleep. In no instance does the prior art disclose a driver alert device that includes a panel which can be secured to a headrest of a vehicle with a plurality of straps and a proximity sensor integrated into the panel to detect the distance between a driver's head and the headrest and a pair of speakers which emit an audible alert when the distance between the driver's head and the headrest exceeds a pre-determined distance.

BRIEF SUMMARY OF THE INVENTION

An embodiment of the disclosure meets the needs presented above by generally comprising a panel that has a plurality of straps coupled to and extending rearwardly from the panel. The straps are extendable around a headrest of a driver's seat of a vehicle to retain the panel on the headrest thereby positioning the panel behind a driver's head when the driver is seated in the driver's seat. A proximity unit is integrated into the panel and the proximity unit senses a distance between the panel and the driver's head when the driver is seated in the driver's seat. Furthermore, the proximity unit emits a perceptible alert when the proximity unit senses the distance between the panel and the driver's head exceeds a trigger distance to alert the driver that the driver's head has tilted forwardly as a result of falling asleep.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
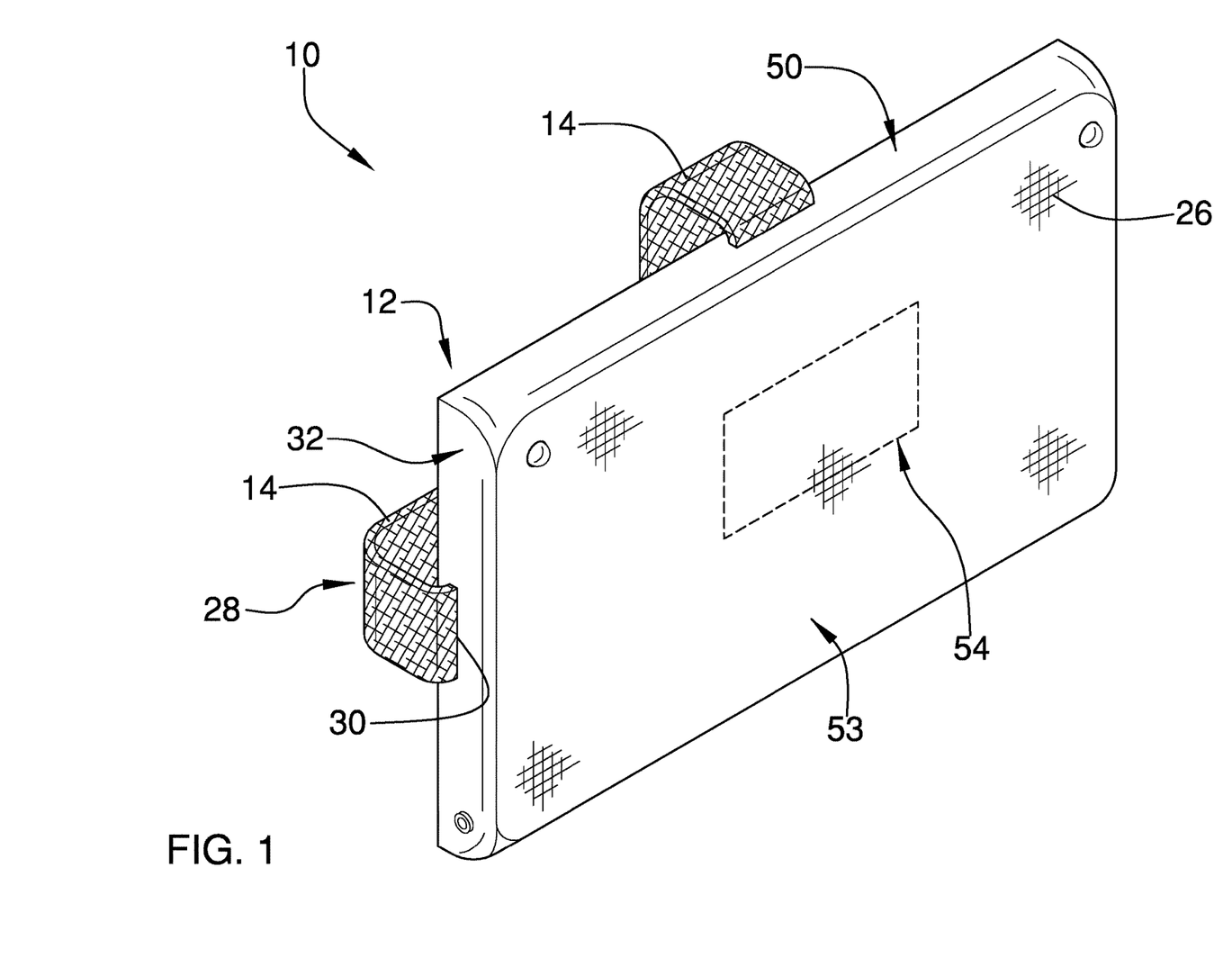
FIG. 1 is a front perspective view of a driver attention alert device according to an embodiment of the disclosure.
Figure 2:
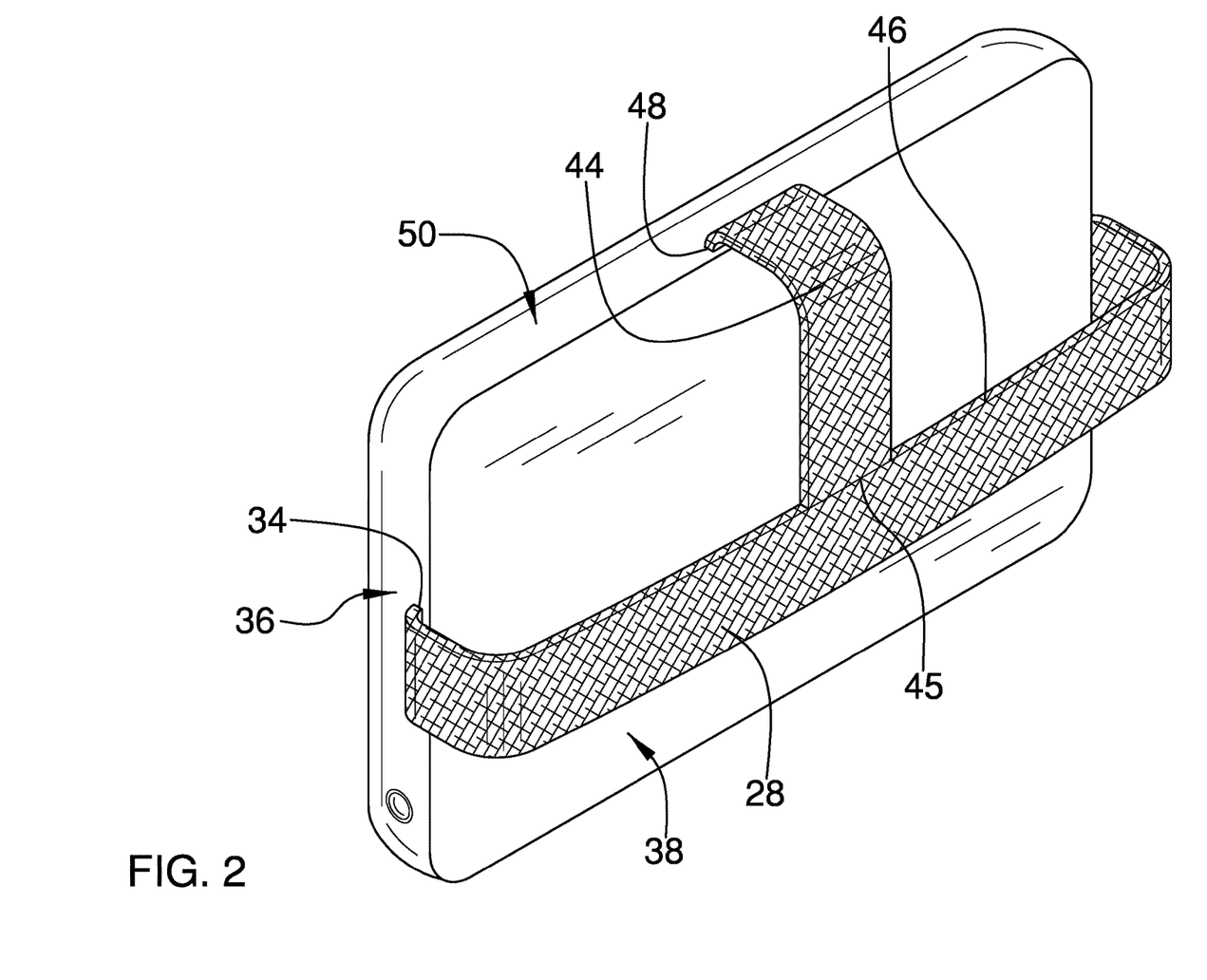
FIG. 2 is a back perspective view of an embodiment of the disclosure.
Figure 3:
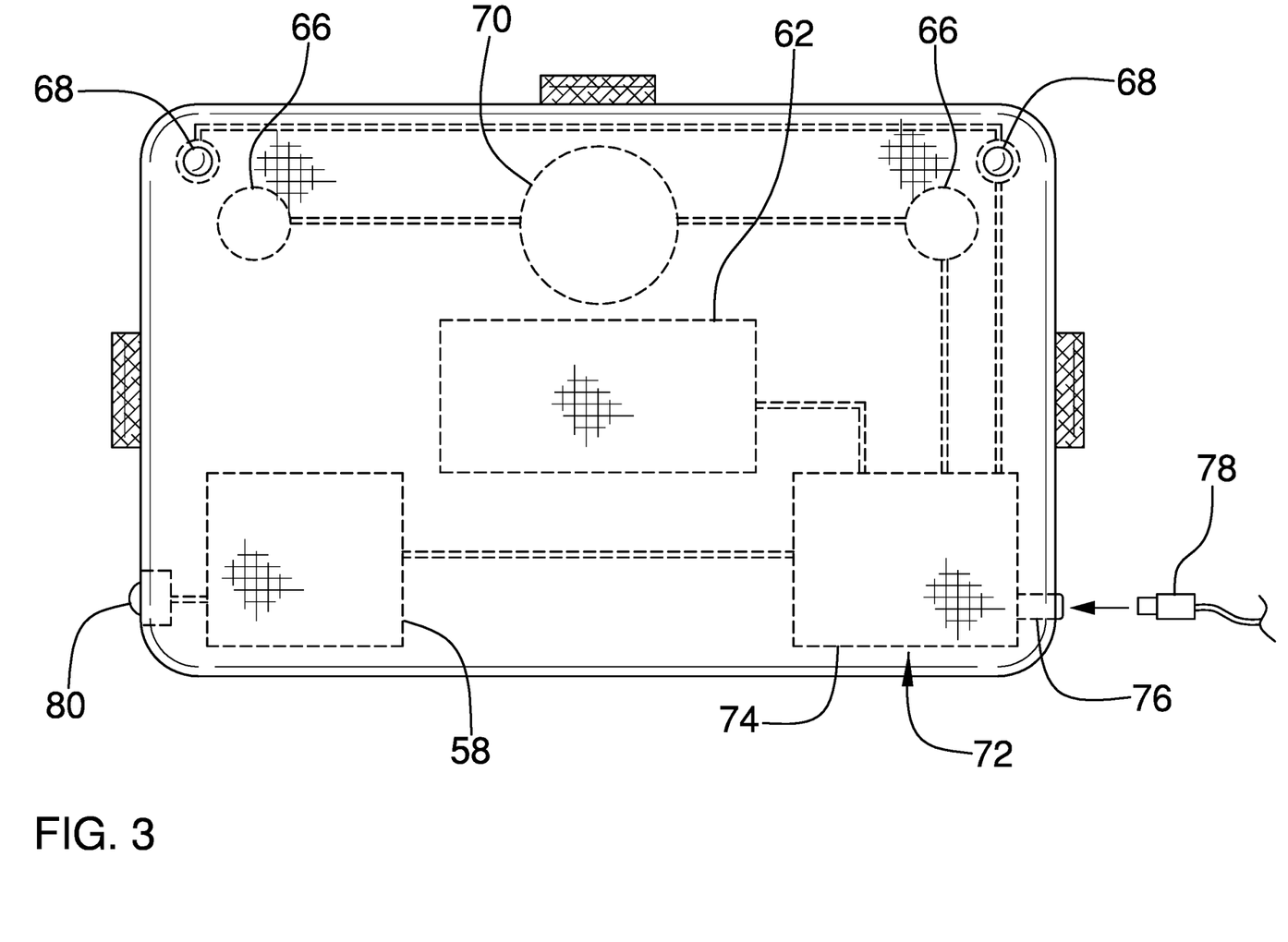
FIG. 3 is a front phantom view of an embodiment of the disclosure.
Figure 4:
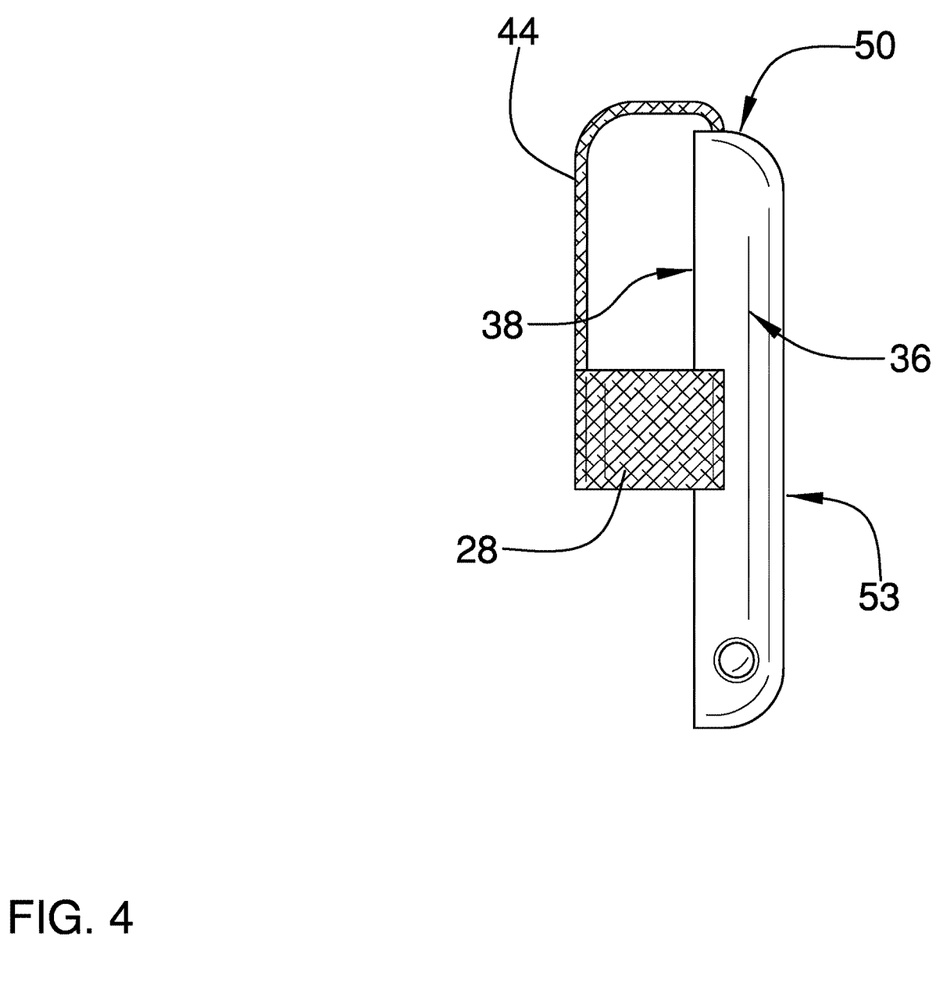
FIG. 4 is a right side view of an embodiment of the disclosure.
Figure 5:
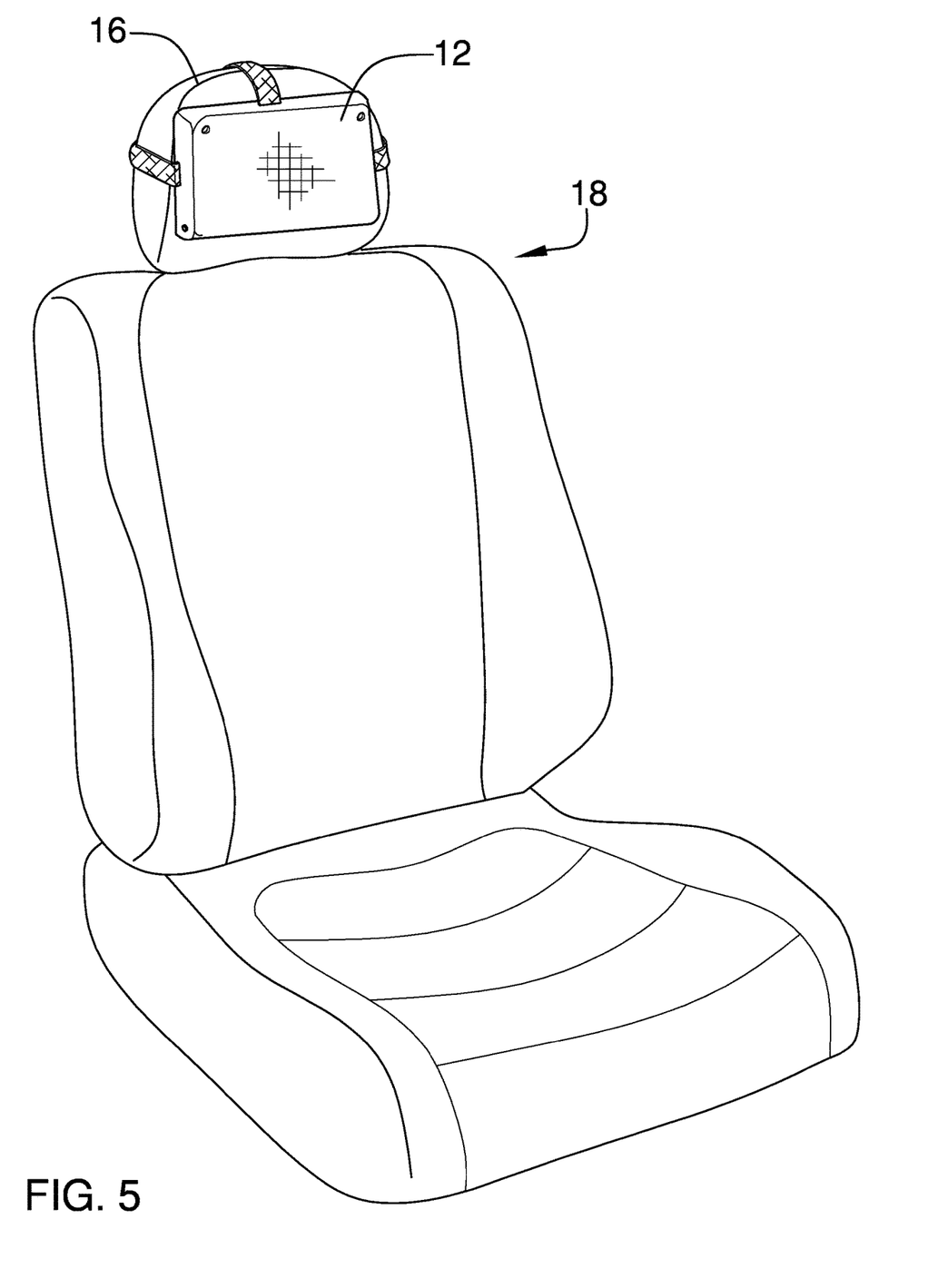
FIG. 5 is a perspective view of an embodiment of the disclosure showing a panel being mounted to a headrest of a vehicle seat.
Figure 6:
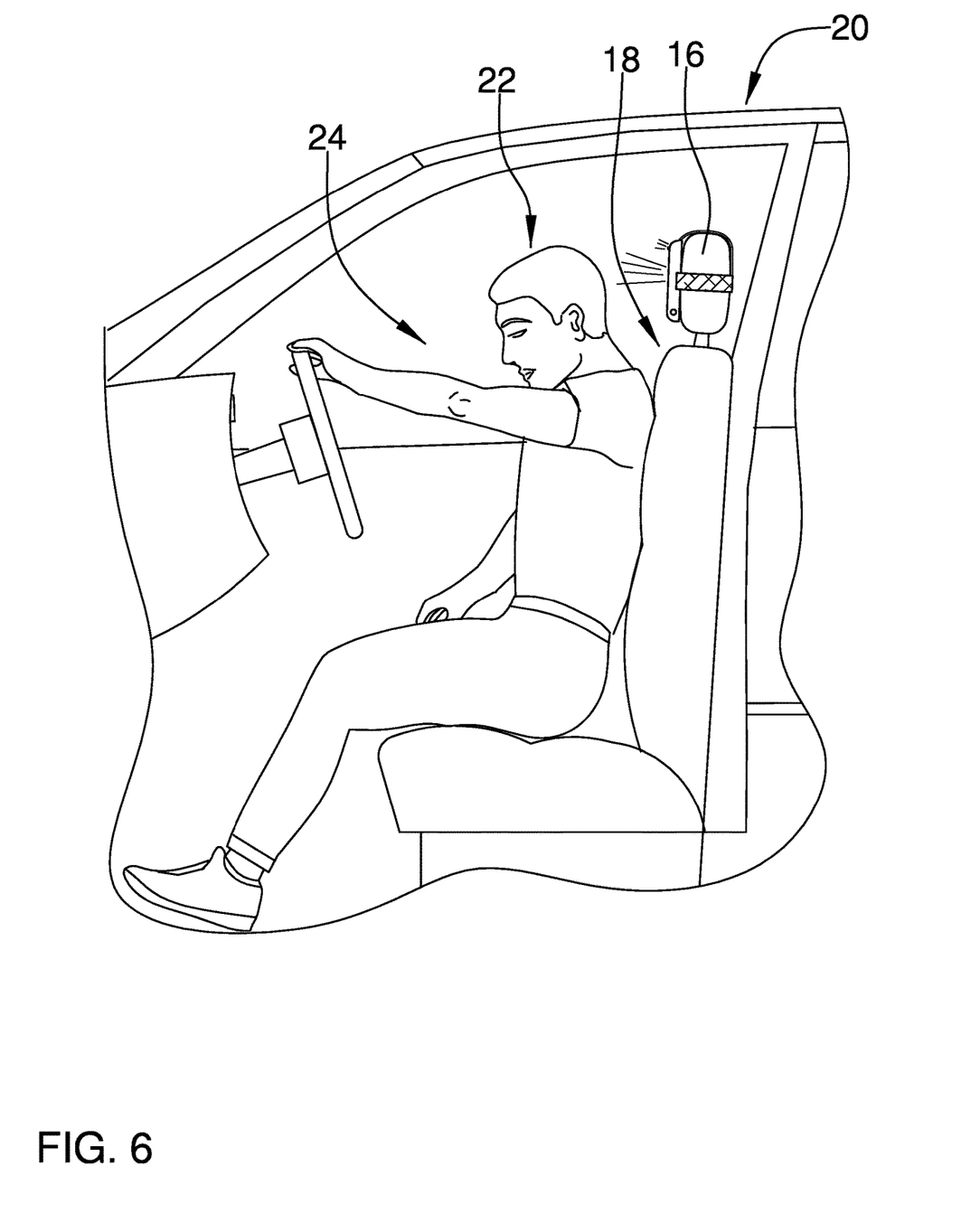
FIG. 6 is a perspective in-use view of an embodiment of the disclosure showing a proximity unit sensing that a driver of a vehicle has fallen asleep.
Figure 7:
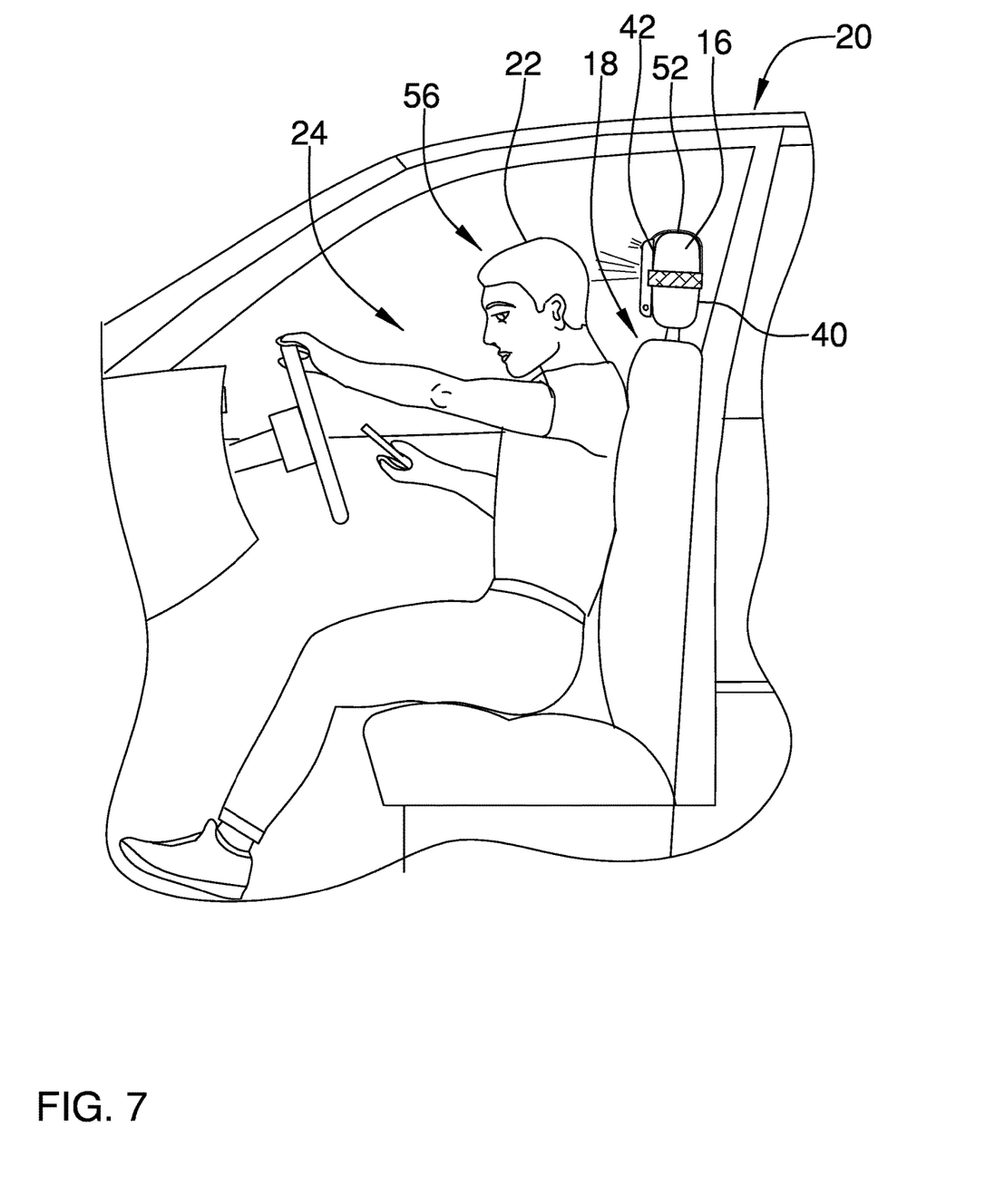
FIG. 7 is a perspective in-use view of an embodiment of the disclosure showing a proximity unit sensing that a personal electronic device is distracting a driver of a vehicle.
Figure 8:
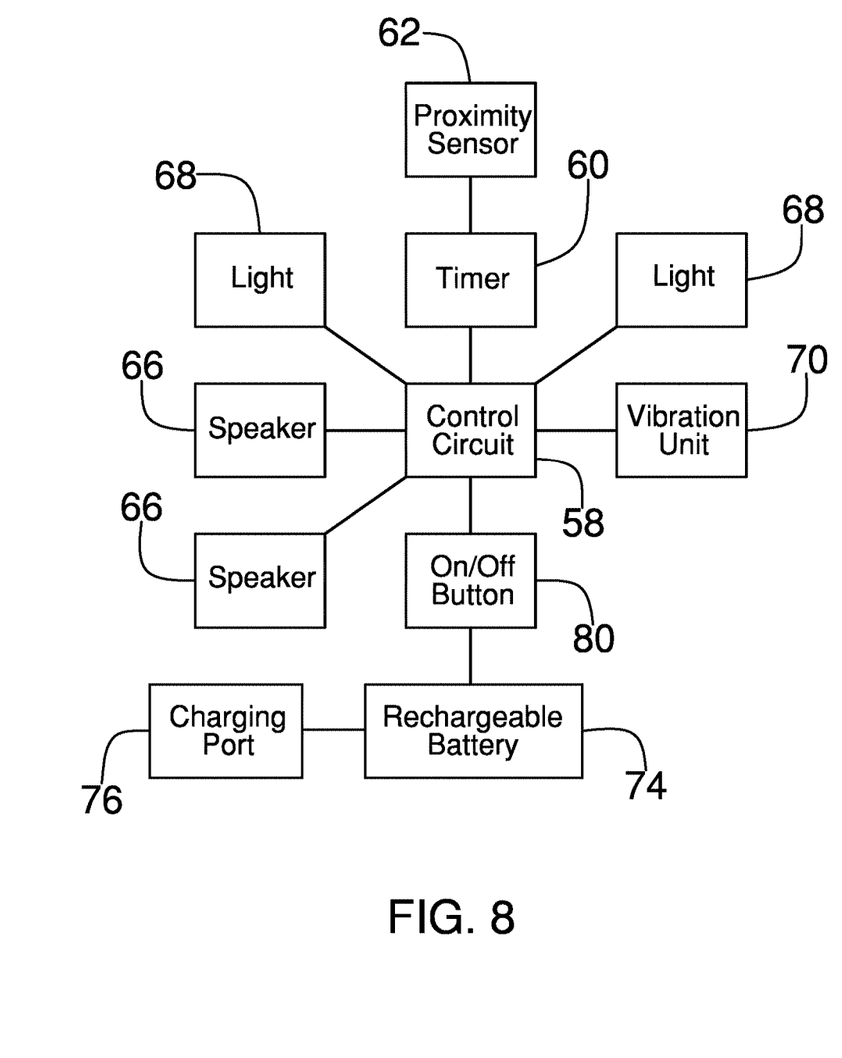
FIG. 8 is a schematic view of an embodiment of the disclosure.

With reference now to the drawings, and in particular to FIGS. 1 through 8 thereof, a new driver alert device embodying the principles and concepts of an embodiment of the disclosure and generally designated by the reference numeral 10 will be described.

As best illustrated in FIGS. 1 through 8, the driver attention alert device 10 generally comprises a panel 12 which has a plurality of straps 14 which are coupled to and extend rearwardly from the panel 12. The plurality of straps 14 are extendable around a headrest 16 of a driver's seat 18 of a vehicle 20 such that the panel 12 is retained on the headrest 16. In this way the headrest 16 is positioned behind a head 22 of a driver 24 when the driver 24 is seated in the driver's seat 18. The vehicle 20 may be a passenger vehicle, a cargo vehicle or any other type of motorized vehicle which is commonly driven on public roadways. A cover 26 is wrapped around the panel 12 such that the cover 26 encloses the panel 12. Furthermore, the cover 26 is comprised of a fluid permeable material, including but not being limited to an organic textile or a synthetic textile, such that the cover 26 can pass light and sound through the cover 26.

The plurality of straps 14 includes a first strap 28 which has a first end 30 that is coupled to a first lateral side 32 of the panel 12 and a second end 34 that is coupled to a second lateral side 36 of the panel 12. The first strap 28 extends across a back side 38 of the panel 12 thereby facilitating the first strap 28 to be extended around a rear side 40 of the headrest 16 having the back side 38 of the panel 12 resting against a forward side 42 of the headrest 16. The plurality of straps 14 includes a second strap 44 which has a primary end 45 that is coupled to a top edge 46 of the first strap 28 and a secondary end 48 that is coupled to a top side 50 of the panel 12. The second strap 44 is centrally located along the top edge 46 of the first strap 28 thereby facilitating the second strap 44 to be extended over an upper side 52 of the headrest 16. In this way the second strap 44 inhibits the panel 12 from sliding downwardly on the forward side 42 of the headrest 16. Each of the first strap 28 and the second strap 44 may be comprised of an elastomeric material thereby facilitating the first strap 28 and the second strap 44 to accommodate a wide variety of sizes of headrests. As is most clearly shown in FIG. 4, an intersection between a front side 53 of the panel 12 and each of the first lateral side 32 and the second lateral side 36 and the top side 50 of the panel 12 may be rounded and an intersection between the back side 38 of the panel 12 and each of the first lateral side 32 and the second lateral side 36 and the top side 50 may be perpendicular.

A proximity unit 54 is provided and the proximity unit 54 is integrated into the panel 12. The proximity unit 54 senses a distance between the panel 12 and an object 56 which is remotely located with respect to the panel 12. In this way the proximity unit 54 can sense the distance between the driver's head 22 and the panel 12 when the driver 24 is seated in the driver's seat 18. Furthermore, the proximity unit 54 emits a perceptible alert when the proximity unit 54 senses the distance between the panel 12 and the object 56 exceeds a trigger distance. In this way the proximity unit 54 can alert the driver 24 that the driver's head 22 has tilted forwardly from the panel 12 potentially as a result of falling asleep or from looking down at a personal electronic device.

The proximity unit 54 comprises a processor 58 which is integrated into the panel 12 and the processor 58 receives a first alert input and a second alert input. The processor 58 includes an electronic timer 60 and the electronic timer 60 is actuated to count down a trigger duration of time when the processor 58 receives the first alert input. Furthermore, the processor 58 receives the second alert input when the electronic timer 60 completes counting down the trigger duration of time. The trigger duration of time may range between approximately 5.0 seconds and 10.0 seconds.

The proximity unit 54 includes a proximity sensor 62 which is integrated into a front side 53 of the panel 12 and the proximity sensor 62 is electrically coupled to the processor 58. The proximity sensor 62 emits a sensing signal thereby facilitating the proximity sensor 62 to sense the distance between front side 53 of the panel 12 and the object 56 that is remotely located with respect to the panel 12. Additionally, the processor 58 receives the first alert input when the proximity sensor 62 senses that the distance between the front side 53 of the panel 12 and the object 56 that is remotely located with respect to the panel 12 exceeds a trigger distance. The trigger distance may be a distance ranging between approximately 5.0 inches and 10.0 inches.

The proximity unit 54 includes a pair of speakers 66 and each of the pair of speakers 66 is integrated into the front side 53 of the panel 12. Each of the pair of speakers 66 is electrically coupled to the processor 58 and each of the speakers 66 is actuated to emit an audible alert when the processor 58 receives the second alert input. In this way each of the pair of speakers 66 can audibly alert the driver 24 that the driver's head 22 has been tilted away from the panel 12 for a potentially dangerous duration of time. Each of the speakers 66 may comprise an electronic speaker of any conventional design which has an output intensity ranging between approximately 60.0 decibels and 80.0 decibels.

The proximity unit 54 includes a pair of lights 68 and each of the pair of lights 68 is integrated into the front side 53 of the panel 12. Each of the pair of lights 68 extends through the cover 26 and each of the pair of lights 68 is actuated when the processor 58 receives the second alert input. In this way each of the pair of lights 68 emits light outwardly from the panel 12 for visually alerting the driver 24 that the driver's head 22 has been tilted away from the panel 12 for a potentially dangerous duration of time. Each of the pair of lights 68 may comprise a light emitting diode or other type of electronic light emitter and each of the pair of lights 68 may emit a red colored light.

The proximity unit 54 includes a vibration unit 70 which is integrated into the panel 12. The vibration unit 70 is electrically coupled to the processor 58 and the vibration unit 70 is actuated when the processor 58 receives the second alert input. Furthermore, the vibration unit 70 vibrates the panel 12 when the vibration unit 70 is actuated. In this way the vibration unit 70 generates a perceptible vibration to alert the driver 24 that the driver's head 22 has been tilted away from the panel 12 for a potentially dangerous duration of time. The vibration unit 70 may comprise an electric motor and a cam which is rotated about an eccentric axis or other type of electromechanical vibration device which is capable of producing a perceptible vibration.

The proximity unit 54 includes a power supply 72 which is integrated into the panel 12 and the power supply 72 is electrically coupled to the processor 58. The power supply 72 includes a rechargeable battery 74 which is integrated into the panel 12 and the rechargeable battery 74 is electrically coupled to the processor 58. The power supply 72 includes a charge port 76 which is recessed into the first lateral side 32 of the panel 12 to insertably receive a charge cord 78. Furthermore, the charge port 76 is electrically coupled to the rechargeable battery 74 for charging the rechargeable battery 74 and the charge port 76 extends through the cover 26. The power supply 72 includes a power button 80 which is movably integrated into the second lateral side 36 of the panel 12 and the power button 80 extends through the cover 26. The power button 80 is electrically coupled to the processor 58 and the power button 80 actuates the processor 58 when the power button 80 is depressed a first time. Conversely, the power button 80 de-actuates the processor 58 when the power button 80 is depressed a second time.

In use, the first strap 28 and the second strap 44 are extended around the headrest 16 of the driver's seat 18 to mount the panel 12 to the forward side 42 of the headrest 16. The power button 80 is depressed a first time to acuate the processor 58 such that the proximity sensor 62 begins sensing the position of the driver's head 22 relative to the headrest 16. The pair of speakers 66 emit the audible alert, the pair of lights 68 emits the light and the vibration unit 70 vibrates the panel 12 in the event that the driver's head 22 tilts forward due to the driver 24 falling asleep or due to the driver 24 looking down at a personal electronic device for the trigger duration of time. In this way the driver 24 is alerted to either pull off the road and rest or to cease looking down at their personal electronic device. Thus, the safety of the driver 24 as well as other motorists is enhanced by reducing the likelihood that the driver 24 will cause a crash as a result of falling asleep or by being distracted by their personal electronic device.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A driver attention alert device for alerting a driver of a vehicle when the driver's head tilts downwardly from a headrest of the vehicle thereby inhibiting the driver from falling asleep while driving the vehicle, said device comprising:
    a panel having a plurality of straps being coupled to and extending rearwardly from said panel, said plurality of straps being extendable around a headrest of a driver's seat of a vehicle having said panel being retained on the headrest wherein said headrest is configured to be positioned behind a driver's head when the driver is seated in the driver's seat;
    a cover being wrapped around said panel such that said cover encloses said panel, said cover being comprised of a fluid permeable material wherein said cover is configured to pass light and sound through said cover; and
    a proximity unit being integrated into said panel, said proximity unit sensing a distance between said panel and an object which is remotely located with respect to said panel wherein said proximity unit is configured to sense the distance between the driver's head and said panel when the driver is seated in said driver's seat, said proximity unit emitting a perceptible alert when said proximity unit senses the distance between said panel and said object exceeds a trigger distance wherein said proximity unit is configured to alert the driver that the driver's head has tilted forwardly as a result of falling asleep.

2. The device according to claim 1, wherein:
    said plurality of straps includes a first strap having a first end being coupled to a first lateral side of said panel and a second end being coupled to a second lateral side of said panel such that said first strap extends across a back side of said panel thereby facilitating said first strap to be extended around a rear side of said headrest having said back side of said panel resting against a forward side of said headrest;
    said plurality of straps includes a second strap having a primary end being coupled to a top edge of said first strap and a secondary end being coupled to a top side of said panel; and
    said second strap is centrally located along said top edge of said first strap thereby facilitating said second strap to be extended over an upper side of said headrest such that said second strap inhibits said panel from sliding downwardly on said forward side of said headrest.

3. The device according to claim 1, wherein:
    said proximity unit includes a processor being integrated into said panel;
    said processor receives a first alert input and a second alert input;
    said processor includes an electronic timer;
    said electronic timer is actuated to count down a trigger duration of time when said processor receives said first alert input;
    said processor receives said second alert input when said electronic timer completes counting down said trigger duration of time;
    said proximity unit includes a proximity sensor being integrated into a front side of said panel;
    said proximity sensor is electrically coupled to said processor;
    said proximity sensor emits a sensing signal thereby facilitating said proximity sensor to sense said distance between front side of said panel and said object being remotely located with respect to said panel; and
    said processor receives said first alert input when said proximity sensor senses that said distance between said front side of said panel and said object being remotely located with respect to said panel exceeds a trigger distance.

4. The device according to claim 3, wherein:
    said proximity unit includes a pair of speakers;
    each of said pair of speakers is integrated into said front side of said panel;
    each of said pair of speakers is electrically coupled to said processor; and
    each of said speakers is actuated to emit an audible alert when said processor receives said second alert input wherein each of said pair of speakers is configured to audibly alert the driver that the driver's head has been tilted away from said panel for a potentially dangerous duration of time.

5. The device according to claim 3, wherein:
    said proximity unit includes a pair of lights;

each of said pair of lights is integrated into said front side of said panel;
each of said pair of lights extends through said cover; and
each of said pair of lights is actuated when said processor receives said second alert input wherein each of said pair of lights is configured to emit light outwardly from said panel for visually alerting the driver that the driver's head has been tilted away from said panel for a potentially dangerous duration of time.

6. The device according to claim 3, wherein:
said proximity unit includes a vibration unit being integrated into said panel;
said vibration unit is electrically coupled to said processor;
said vibration unit is actuated when said processor receives said second alert input; and
said vibration unit vibrates said panel when said vibration unit is actuated wherein said vibration unit is configured to generate a perceptible vibration to alert the driver that the driver's head has been tilted away from said panel for a potentially dangerous duration of time.

7. The device according to claim 3, wherein:
said proximity unit includes a power supply being integrated into said panel;
said power supply is electrically coupled to said processor, said power supply comprises:
  a rechargeable battery being integrated into said panel, said rechargeable battery being electrically coupled to said processor;
  a charge port being recessed into said first lateral side of said panel wherein said charge port is configured to insertably receive a charge cord, said charge port being electrically coupled to said rechargeable battery for charging said rechargeable battery, said charge port extending through said cover; and
  a power button being movably integrated into said second lateral side of said panel, said power button being electrically coupled to said processor, said power button actuating said processor when said power button is depressed a first time, said power button de-actuating said processor when said power button is depressed a second time, said power button extending through said cover.

8. A driver attention alert device for alerting a driver of a vehicle when the driver's head tilts downwardly from a headrest of the vehicle thereby inhibiting the driver from falling asleep while driving the vehicle, said device comprising:
  a panel having a plurality of straps being coupled to and extending rearwardly from said panel, said plurality of straps being extendable around a headrest of a driver's seat of a vehicle having said panel being retained on the headrest wherein said headrest is configured to be positioned behind a driver's head when the driver is seated in the driver's seat, said plurality of straps including a first strap having a first end being coupled to a first lateral side of said panel and a second end being coupled to a second lateral side of said panel such that said first strap extends across a back side of said panel thereby facilitating said first strap to be extended around a rear side of said headrest having said back side of said panel resting against a forward side of said headrest, said plurality of straps including a second strap having a primary end being coupled to a top edge of said first strap and a secondary end being coupled to a top side of said panel, said second strap being centrally located along said top edge of said first strap thereby facilitating said second strap to be extended over an upper side of said headrest such that said second strap inhibits said panel from sliding downwardly on said forward side of said headrest;
  a cover being wrapped around said panel such that said cover encloses said panel, said cover being comprised of a fluid permeable material wherein said cover is configured to pass light and sound through said cover;
  a proximity unit being integrated into said panel, said proximity unit sensing a distance between said panel and an object which is remotely located with respect to said panel wherein said proximity unit is configured to sense the distance between the driver's head and said panel when the driver is seated in said driver's seat, said proximity unit emitting a perceptible alert when said proximity unit senses the distance between said panel and said object exceeds a trigger distance wherein said proximity unit is configured to alert the driver that the driver's head has tilted forwardly as a result of falling asleep, said proximity unit comprising:
    a processor being integrated into said panel, said processor receiving a first alert input and a second alert input, said processor including an electronic timer, said electronic timer being actuated to count down a trigger duration of time when said processor receives said first alert input, said processor receiving said second alert input when said electronic timer completes counting down said trigger duration of time;
    a proximity sensor being integrated into a front side of said panel, said proximity sensor being electrically coupled to said processor, said proximity sensor emitting a sensing signal thereby facilitating said proximity sensor to sense said distance between front side of said panel and said object being remotely located with respect to said panel, said processor receiving said first alert input when said proximity sensor senses that said distance between said front side of said panel and said object being remotely located with respect to said panel exceeds a trigger distance;
    a pair of speakers, each of said pair of speakers being integrated into said front side of said panel, each of said pair of speakers being electrically coupled to said processor, each of said speakers being actuated to emit an audible alert when said processor receives said second alert input wherein each of said pair of speakers is configured to audibly alert the driver that the driver's head has been tilted away from said panel for a potentially dangerous duration of time;
    a pair of lights, each of said pair of lights being integrated into said front side of said panel, each of said a pair of lights extending through said cover, each of said pair of lights being actuated when said processor receives said second alert input wherein each of said pair of lights is configured to emit light outwardly from said panel for visually alerting the driver that the driver's head has been tilted away from said panel for a potentially dangerous duration of time;
    a vibration unit being integrated into said panel, said vibration unit being electrically coupled to said processor, said vibration unit being actuated when said processor receives said second alert input, said vibration unit vibrating said panel when said vibration unit is actuated wherein said vibration unit is configured to generate a perceptible vibration to alert the driver that the driver's head has been tilted away from said panel for a potentially dangerous duration of time; and a power supply being integrated into said panel, said power supply being electrically coupled to said processor, said power supply comprising:
  a rechargeable battery being integrated into said panel, said rechargeable battery being electrically coupled to said processor;
  a charge port being recessed into said first lateral side of said panel wherein said charge port is configured to insertably receive a charge cord, said charge port being electrically coupled to said rechargeable battery for charging said rechargeable battery, said charge port extending through said cover; and
  a power button being movably integrated into said second lateral side of said panel, said power button being electrically coupled to said processor, said power button actuating said processor when said power button is depressed a first time, said power button de-actuating said processor when said power button is depressed a second time, said power button extending through said cover.

* * * * *